US009796423B2

(12) United States Patent
LaVilluniere (10) Patent No.: US 9,796,423 B2
(45) Date of Patent: Oct. 24, 2017

(54) VEHICLE SUSPENSION CRADLE STRUCTURE (71) Applicant: RENAULT s.a.s., Boulogne-Billancourt (FR)

(72) Inventor: Vincent LaVilluniere, Herblay (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/039,767

(22) PCT Filed: Nov. 6, 2014

(86) PCT No.: PCT/FR2014/052826
§ 371 (c)(1),
(2) Date: May 26, 2016

(87) PCT Pub. No.: WO2015/079136
PCT Pub. Date: Jun. 4, 2015

(65) Prior Publication Data
US 2017/0001666 A1    Jan. 5, 2017

(30) Foreign Application Priority Data
Nov. 28, 2013  (FR) ...................................... 13 61799

(51) Int. Cl.
*B62D 21/02*    (2006.01)
*B60G 7/02*    (2006.01)
(Continued)

(52) U.S. Cl.
CPC .............. *B62D 21/02* (2013.01); *B60G 7/001* (2013.01); *B60G 7/02* (2013.01); *B60G 21/055* (2013.01);
(Continued)

(58) Field of Classification Search
CPC .......... B62D 21/02; B62D 7/00; B62D 25/08; B62D 21/11; B62D 3/12; B60G 21/055;
(Continued)

(56) References Cited

U.S. PATENT DOCUMENTS 4,060,011  A     11/1977  Jones
4,458,915  A  *   7/1984  Emery ................... B60G 3/202
                                                   280/124.146
(Continued)

FOREIGN PATENT DOCUMENTS

EP    0 794 106 A2    9/1997
FR    2 295 850 A1    7/1976
FR    2 615 458 A1    11/1988

OTHER PUBLICATIONS

International Search Report dated Mar. 11, 2015, in PCT/FR2015/052826 filed Nov. 6, 2014.
(Continued)

*Primary Examiner* — Darlene P Condra
(74) *Attorney, Agent, or Firm* — Oblon, McClelland, Maier & Neustadt, L.L.P.

(57) ABSTRACT

A front unit of a motor vehicle includes a transverse beam forming a casing with a steering rack and having, at ends of the transverse beam, protuberances arranged to be fixed to a receiving structure of the vehicle. The front unit also includes two suspension arms, each positioned at one of the ends of the transverse beam and each having at least one first and one second pivot joint. The transverse beam includes a fixing interface to receive a single pivot joint of each of the suspension arms.

12 Claims, 4 Drawing Sheets (51) Int. Cl.
<table>
<tr><td>B62D 3/12</td><td>(2006.01)</td></tr>
<tr><td>B62D 21/11</td><td>(2006.01)</td></tr>
<tr><td>B62D 25/08</td><td>(2006.01)</td></tr>
<tr><td>B60G 7/00</td><td>(2006.01)</td></tr>
<tr><td>B60G 21/055</td><td>(2006.01)</td></tr>
<tr><td>B62D 7/00</td><td>(2006.01)</td></tr>
</table>

(52) U.S. Cl.
CPC ............... *B62D 3/12* (2013.01); *B62D 7/00* (2013.01); *B62D 21/11* (2013.01); *B62D 25/08* (2013.01); *B60G 2200/44* (2013.01); *B60G 2200/445* (2013.01); *B60G 2204/1431* (2013.01); *B60G 2204/15* (2013.01); *B60G 2206/123* (2013.01)

(58) Field of Classification Search
CPC .... B60G 7/001; B60G 7/02; B60G 2206/123; B60G 2200/44; B60G 2204/1431; B60G 2204/15; B60G 2200/445
See application file for complete search history.

(56) References Cited

U.S. PATENT DOCUMENTS

<table>
<tr><td>2003/0030241 A1*</td><td>2/2003</td><td>Lawson</td><td>B60G 3/10<br>280/93.512</td></tr>
<tr><td>2003/0107200 A1*</td><td>6/2003</td><td>Huang</td><td>B60G 7/02<br>280/93.515</td></tr>
<tr><td>2012/0235397 A1</td><td>9/2012</td><td>Kroger et al.</td><td></td></tr>
</table>

OTHER PUBLICATIONS

French Search Report dated Apr. 9, 2014, in French Application No. 1361799 filed Nov. 28, 2013.

* cited by examiner

VEHICLE SUSPENSION CRADLE STRUCTURE

TECHNICAL FIELD OF THE INVENTION

The technical field of the invention is that of motor vehicles, and in particular front units of motor vehicles.

PRIOR ART

It is already generally known for architecture of a front unit of a vehicle, in particular of the front wheel drive type with a transversely mounted power plant, to comprise at least:
  two side members forming the receiving structure, one on the left and one on the right, these side members supporting most of the auxiliary elements;
  a transversely mounted power plant suspended on the side members;
  a lower chassis cradle supporting lower suspension arms, a steering rack and an anti-roll bar.

In such a configuration, the lower chassis cradle has the function of setting the geometry of the various elements constituting the chassis. In fact, the relative precision of its production, in comparison with that of the body, guarantees a minimum spread which is necessary for the good function of the chassis.

In the event of a crash, in particular an accidental impact at the front of the vehicle, the energy introduced into the vehicle is partly absorbed by the deformation of the various structural parts of the front unit such as the side members. Another part of this energy is transmitted to the remainder of the body.

In this case, there are often two pathways for transmission and absorption of the energy:
  the top pathway, represented by the side members;
  the bottom pathway, represented either by a frame cradle or by an "add-on" element coupled to a mini-cradle, said bottom pathway being implemented by removable parts which do not form an integral part of the structure.

This structural configuration corresponds to a very specific architecture as described above. However, such a front unit is not always the best compromise between weight/cost/performance.

For example, this is a common topology in which the steering rack is after the wheel, i.e. behind the front axle, and behind the suspension arm. Such an arrangement gives a significant vertical compactness while offering a kinematic compatibility between the length of the arm and the steering tie rod over almost the entire deflection of the wheel. However, in some architectures it becomes very difficult, for various reasons of feasibility, to position the steering rack behind the suspension arm. In this case the rack is above the arm, or even in front of the arm.

Also, in the case of a steering rack in front of the suspension arm, for reasons of chassis topology, it is almost essential to position the outlet of the rack as low as possible relative to the suspension arm.

In certain cases also, the bottom pathway is implemented by a structure forming an integral part of the body which cannot therefore be removed, imposing constraints in the case of maintenance. In this case and in particular in the case of an impact, replacement of damaged parts becomes problematical.

For these various reasons, it is very difficult or almost impossible to position the steering rack and the cradle as required.

One solution to this problem in which the cradle is eliminated is disclosed in document EP 0 794 106. In particular, this describes a front unit of a motor vehicle comprising:
  a transverse beam forming a casing with a steering rack;
  two supports fixed firstly to each end of the transverse beam and secondly to a receiving structure of the vehicle; and
  two suspension arms, each of said suspension arms being fixed to one of the supports via two pivot joints.

However, such an assembly has the particular drawback of requiring the use of solid, heavy and costly parts.

Also, since these parts must be solid, they have an adverse effect in the case of a crash affecting the energy absorption capacity of the various structural parts of the front unit. In fact in the case of a crash, such solid parts act as a "mask", preventing the compacting of the receiving structure, for example the side members.

Also, because of this configuration, a steering rack is proposed which is positioned above the suspension arms, between the two pivot joints of the latter. In no case does this solution offer a steering rack positioned in front of the suspension arms.

Also, such a configuration of the transverse beam with these supports and suspension arms leads to a parasitic flexibility, which counters the desired rigidity of reception.

DESCRIPTION OF THE INVENTION

The device described below proposes to remedy all or part of the drawbacks of the prior art, and in particular allows production, in a simple and reliable manner, of a front unit which does not require a cradle to improve its compactness, while observing the desired chassis topology and, in the case of impact, good absorption of resulting energy.

To do this, according to a first aspect of the invention, a front unit of a motor vehicle is proposed, comprising:
  a transverse beam forming a casing with a steering rack and having at its ends protuberances arranged to be fixed to a receiving structure of the vehicle;
  two suspension arms, each positioned at one of the ends of the transverse beam and each having at least one first and one second pivot joint, the front unit being characterized in that the transverse beam comprises a fixing interface to receive a single pivot joint of each of the suspension arms.

Such a front unit, in which the suspension arms are connected to the transverse beam by a single pivot joint, allows a reduction in the space required and therefore promotes the compactness of the receiving structure of the vehicle, and hence its capacity to absorb the energy resulting from an impact, for example in an accident.

This receiving structure may be formed for example by side members, or may comprise elevations.

According to a particular characteristic, each of the suspension arms comprises:
  the first pivot joint fixed to the fixing interface; and
  the second pivot joint fixed to the receiving structure of the vehicle.

In such a configuration, only the pivot joint fixed to the fixing interface requires precise assembly. This precision is necessary to reduce the kinematic spread between parts. Thus the second pivot joint fixed to the receiving structure does not require such a precise positioning.

The production cost is therefore reduced and the rigidity of support improved, together with safety.

Advantageously, the suspension arms are situated at a horizontal level as close as possible to the level of the steering rack. This physical principle may be applied to any type of topology consisting of suspension arm, steering rack and tie rod.

Further advantageously, the front unit comprises a front part intended to be directed towards the front of the vehicle, and a rear part intended to be directed towards the rear of the vehicle, the steering rack being situated at the front relative to the suspension arms. This configuration allows a compactness of the front unit. It is the consequence of the reduction in distance between the axis of the front axle and the driver's seat. It facilitates organization of the steering column, the pedals and the ergonomics of the driver's seat. In fact at the end of the steering column, the rack is moved forward (and the driver also, relative to the front axle axis). It then finishes in front of the suspension arm which does not move relative to the wheel. The present invention thus allows the feasibility of this compactness and supports the new rack position. This innovation may apply to any type of independent front wheel suspension: classic pseudo-MacPherson, semi-false pivot MacPherson (lower arm comprising two tie rods), double wishbone, double wishbone with false or semi-false pivot, independent pivot suspension, etc.

According to another technical characteristic, the first pivot joint is situated at the front relative to the second pivot joint. The first pivot joint thus designates an anterior pivot joint, and the second pivot joint a posterior pivot joint.

In such a configuration, the energy absorption capacity in the case of impact is improved.

In a particular configuration, each of the second pivot joints is fixed to a cap, said cap being welded to the receiving structure.

Preferably, the first and second pivot joints comprise bearings to ensure their rotational movement, preferably a horizontal rotational movement.

According to a particular advantage, the steering rack is carried by a rack bar, said steering rack bar being guided by flanges in the casing.

Preferably, two flanges are provided, each being positioned at one of the ends of the beam, further preferably in a tubular part of each of the protuberances, and each carrying a guide bearing through which the steering rack passes, to connect said rack bar to the flange and hence guide its transverse translational movement.

In a particular embodiment, these flanges are fixed to the beam forming the casing by bolting, in particular by a plurality of bolts.

The front unit also comprises a steering pinion carried by a steering column, the steering pinion being guided in the casing by a roller bearing and a needle cage.

Steering gaiters may be provided to ensure a seal between the beam forming the casing and the steering tie rods situated at the ends of the steering rack bar.

Preferably, each of these gaiters is fitted over one of the flanges and held fixedly to the beam forming the casing by means of a fixing collar attached to said beam forming the casing, preferably by bolting the collar into one of the protuberances.

To facilitate the fixing of the gaiters to the transverse beam, one or more windows may be provided locally on a wall of the protuberances. The clamping of the gaiter fixing collar is then easier and better, and material forming the beam is saved.

According to a particular technical configuration, the front unit comprises an anti-roll bar. This anti-roll bar stabilizes the vehicle by reducing the effects of bends and irregularities of the road, thus improving road holding.

Advantageously, this anti-roll bar is fixed to the casing by means of support collars for holding the anti-roll bar on bearings which are fixed, preferably by bolting, to the protuberances of the casing.

Further advantageously, the casing is made of one piece. This in particular gives the advantage of improving the rigidity of the assembly while avoiding any parasitic flexibility, and hence of improving the mechanical strength of the various parts.

According to another aspect of the invention, a motor vehicle is also proposed, characterized in that it comprises a front unit having all or some of the above characteristics.

The invention is described above as an example. It is understood that the person skilled in the art is able to perform various embodiments of the invention, for example by combining different characteristics taken alone or in combination or as a function of need, without leaving the scope of the invention.

BRIEF DESCRIPTION OF THE FIGURES

Further characteristics and advantages of the invention will arise from reading the description below, given merely as an example, with reference to the attached drawings in which.

For greater clarity, identical or similar elements carry identical reference symbols on all figures.

DETAILED DESCRIPTION OF AN EMBODIMENT

Figures 1, 2A:
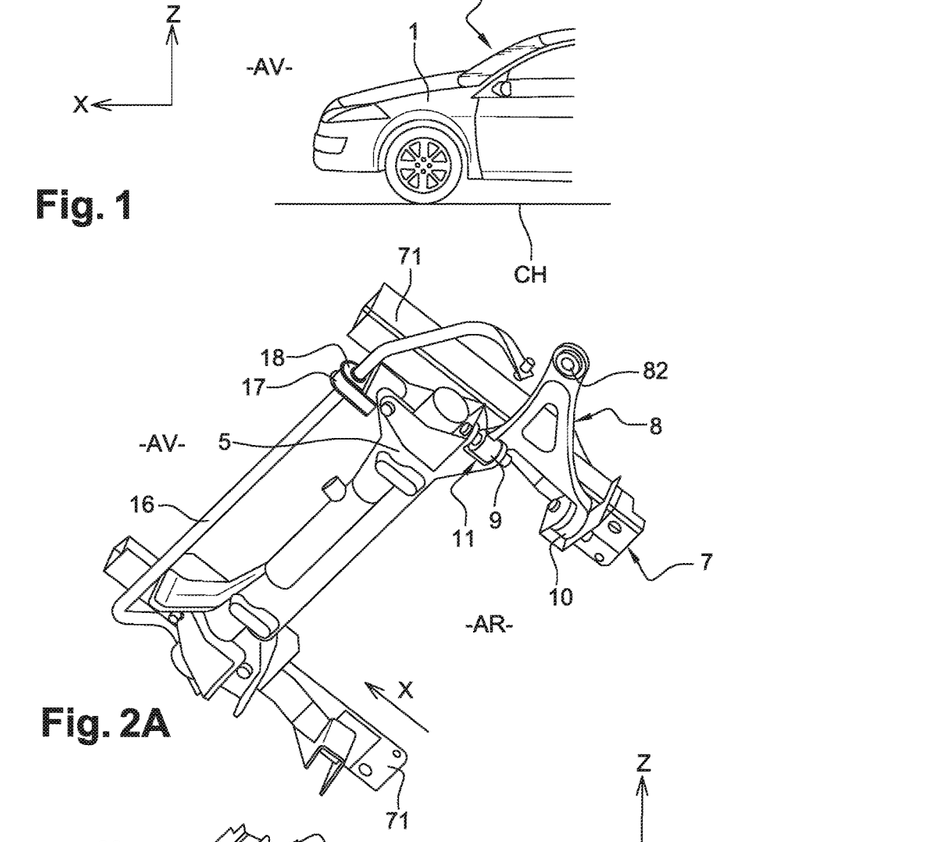
FIG. 1 is a diagram of the front of a vehicle.
FIGS. 2A and 2B show two perspective views from below and above respectively, of a transverse beam fixed to a receiving structure according to one embodiment.

FIG. 1 illustrates a diagram of a front part of a motor vehicle 2 equipped with a front unit 1, said motor vehicle 2 travelling on a road CH in a longitudinal direction X. The road CH defines a horizontal plane, and a vertical axis Z is defined as perpendicular to this horizontal plane.

FIGS. 2A, 2B, 3 and 4 illustrate a transverse beam 3 and a receiving structure 7 of a motor vehicle 2.

In particular, the receiving structure 7 here comprises two substantially parallel side members 71, oriented in a longitudinal axis X relative to the motor vehicle 2.

The transverse beam 3 is here formed of one piece, i.e. integrally, so as to reduce the parasitic flexibility on use of the vehicle 2, and also forms a casing with a steering rack 4. In a fixed position relative to the receiving structure 7, the beam 3 extends between the two side members 71 in a transverse axis Y of the vehicle 2, said axis Y being orthogonal to said two side members 71. The transverse beam 3 has a tubular median part 31 (see FIG. 6A) which is open at its ends, and inside which said steering rack 4 is arranged.

The transverse beam 3 has at its ends 5 protuberances 6 arranged to be fixed to the receiving structure 7 of the vehicle 2, and thus provide the mechanical connection between the beam 3 and the side members 71. These protuberances 6 extend substantially in the extension of the beam 3 and also have a substantially tubular portion 61 delimiting an inner space, this inner space communicating with the inside of the tubular median part 31.

The front unit 1 comprises two suspension arms 8, each of said arms being positioned at one of the ends 5 of the transverse beam 3 and each having at least one first pivot joint 9 and one second pivot joint 10.

The figures show only a single suspension arm 8 so as to improve the legibility of the figures.

The suspension arms 8 ensure a connection between the unsuspended masses of the vehicle, such as the vehicle wheels, and the suspended masses such as the body. These suspension arms 8 in general, together with a spring and a damper (not shown on the figures), form the vehicle suspension.

More precisely, each of the suspension arms 8 comprises, for its fixing to the unsuspended masses of the vehicle 2:
a first pivot joint 9 fixed to a fixing interface 11 of the transverse beam 3; and
a second pivot joint 10 fixed to the receiving structure 7 of the vehicle 2;
the transverse beam 3 being fixed to the suspension arm 8 by a fixing interface 11 to receive a single pivot joint of each of the suspension arms 8.

Figure 4:
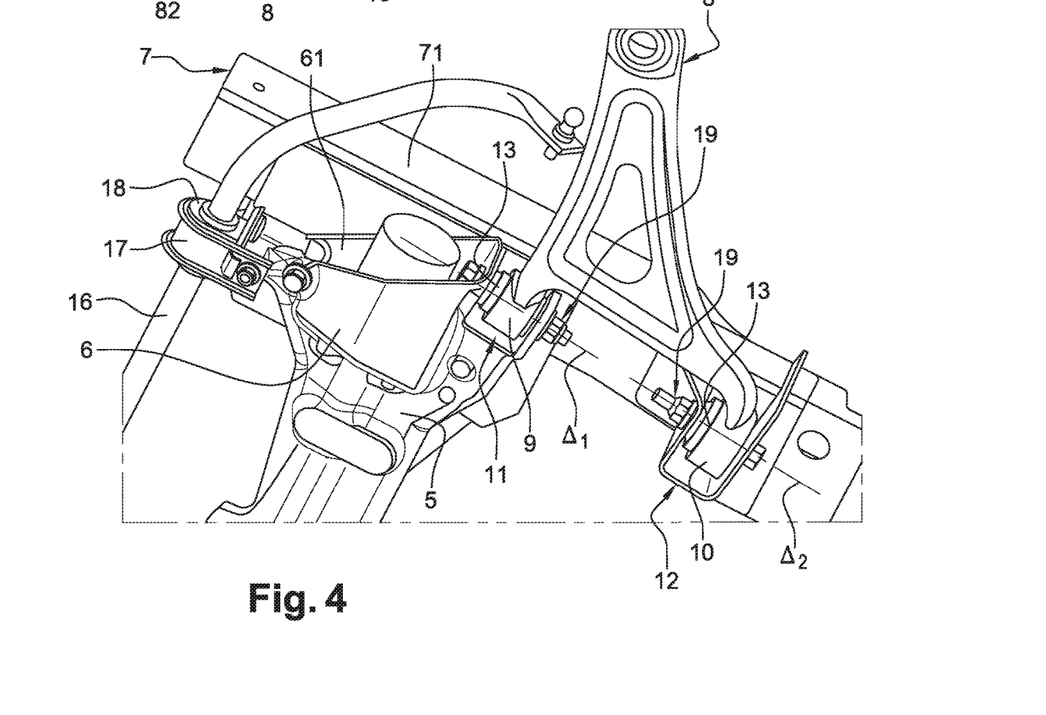
FIG. 4 is a perspective view of an oscillating arm fixed to a beam and to a receiving structure of a vehicle according to this embodiment.

These suspension arms substantially form triangles, the base 80 of which carries the first and second pivot joints 9, 10, and at the tip 81 of which is a fixing ball 82 for attachment to the suspended masses of the vehicle 2, for example to a stub axle which is itself connected to a hub of one of the wheels of the vehicle 2.

Also, the front unit 1 comprises a front part AV intended to be directed towards the front of the vehicle 2, and a rear part AR intended to be directed towards the rear of the vehicle 2 in its longitudinal axis X, the first pivot joint 9 being situated at the front relative to the second pivot joint 10, such that the first pivot joint 9 defines an anterior pivot joint and the second pivot joint 10 a posterior pivot joint.

Figure 3:
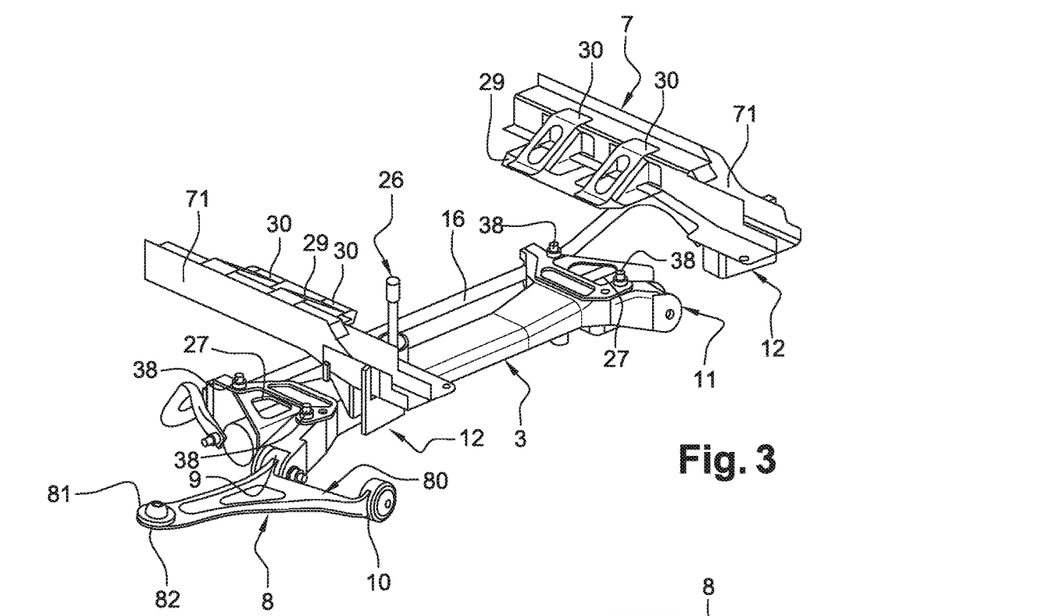
FIG. 3 shows a perspective, partly exploded view of a transverse beam and a receiving structure according to this embodiment.

The fixing interface 11 substantially has a U-shaped cross section comprising two fixing walls, between which the first pivot joint 9 is placed. This U shape is substantially oriented in a transverse direction Y and is open opposite the tubular median part 31 of the beam 3, i.e. towards the outside relative to the transverse beam 3.

This first pivot joint 9 carries a bearing 13 and is fixed to the fixing interface 11 by a bolt/nut assembly 19 which passes through at least the two fixing walls and the bearing 13, the bolt forming locally a shaft for rotation of the first pivot joint 9 relative to the transverse beam 3 about an axis $\Delta_1$ which is contained in a plane parallel to the horizontal plane and substantially parallel to the longitudinal axis X of the vehicle.

In this embodiment, the fixing interface 11 is carried by the protuberance 6 of the beam 3 and placed behind it relative to the longitudinal axis X.

Also, each of the two pivot joints 10 of the suspension arms 3 is fixed to a cap 12, said cap being welded to the receiving structure 7.

In the same way as the fixing interfaces 11 which are firmly fixed to the protuberances 6 at the ends 5 of the transverse beam 3, the caps 12 also have a substantially U-shaped cross section comprising two fixing walls between which the second pivot joint 10 is placed.

This U shape is also oriented in the transverse direction Y and towards the outside relative to the receiving structure 7.

Another bearing 13 is provided at each of the two pivot joints 10, such that these two pivot joints 10 are each held in rotation relative to the receiving structure 7 by means of another bolt/nut assembly 19, which passes through at least the two fixing walls of the cap 12 and this other bearing 13, forming a shaft for rotation about an axis $\Delta_2$.

In an assembled configuration, the first and second pivot joints 9, 10 each form a pivot connection to the beam 3 and the receiving structure 7 respectively. The suspension arms 8 are thus each pivotably connected, with axis parallel to the longitudinal axis X.

The axis $\Delta_2$ of rotation of the second pivot joint 10 relative to the receiving structure 7 is parallel to, and more precisely colinear with, the axis $\Delta_1$ of rotation of the first pivot joint 9 of the same suspension arm 8 relative to the transverse beam 3, these axes $\Delta_1$ and $\Delta_2$ lying in the extension of each other and consequently coinciding in a single and same rotation axis. However, in other configurations, these rotation axes $\Delta_1$, $\Delta_2$ may be offset while remaining parallel to each other. Also, relative to the receiving structure 7 and in particular relative to the side members 71 or the plane formed by the side members 71, and as a function of the various compromises between performance/cost/benefit, the rotation axes $\Delta_1$, $\Delta_2$ may lie in other orientations relative to the plane formed by said side members 71, or even orthogonal. For example, the first or second pivot joint 9, 10 may have a vertical axis.

In a fixed position, the suspension arms 8 are situated at a horizontal level above the level of the steering rack 4. In other words, the suspension arms have a height along the vertical axis Z which is greater than the height of the steering rack 4.

Also, in this embodiment, the steering rack 4 is arranged such that it is situated at the front relative to the suspension arms 8.

Figure 5:
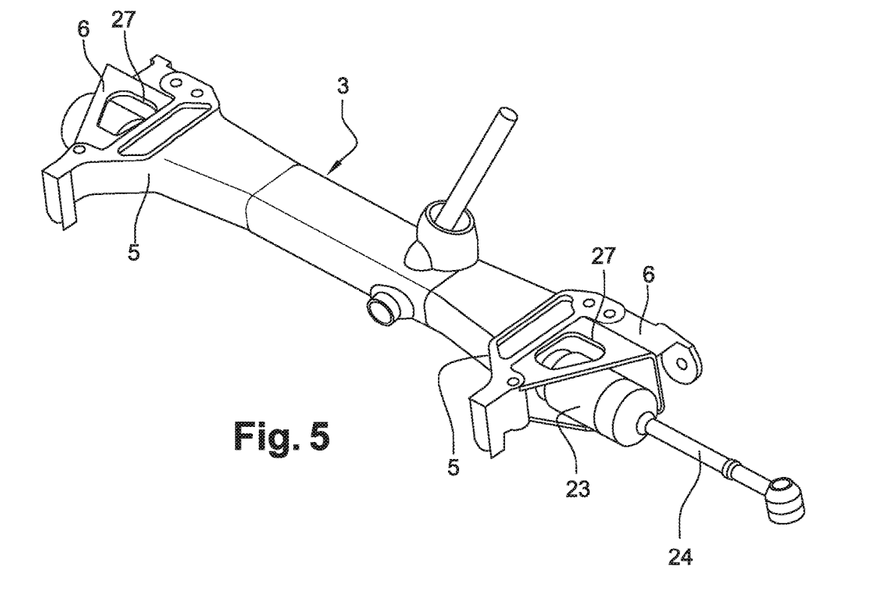
FIG. 5 is a perspective view of a beam according to this embodiment.
Figure 6A:
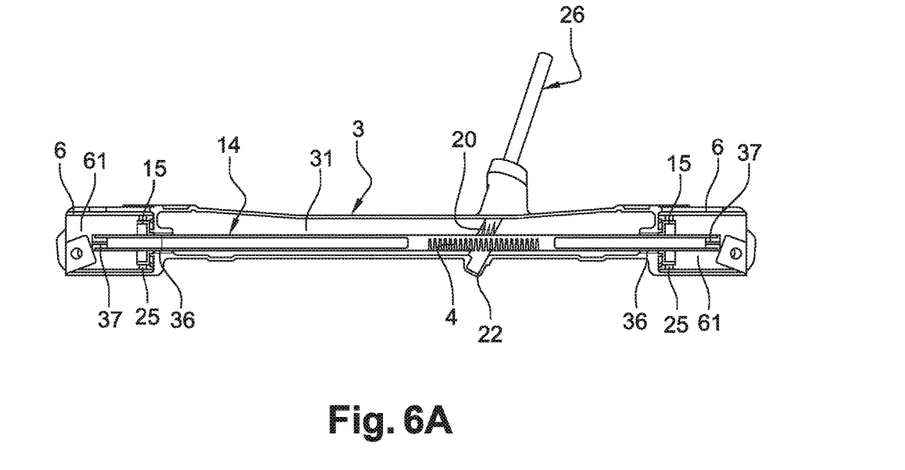
FIGS. 6A and 6B show two cross section views of a beam forming the casing of a steering rack according to this embodiment, and a means for guiding said steering rack according to one embodiment.
Figure 6B:
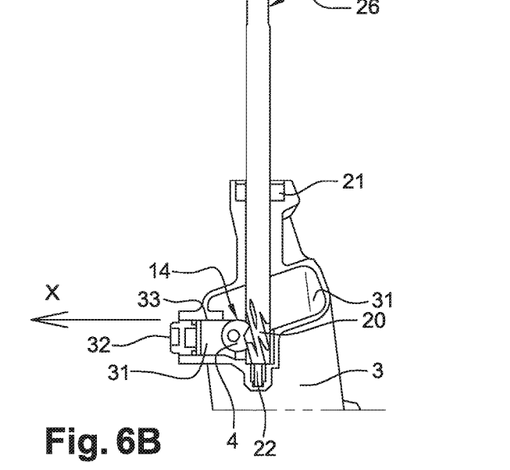

More precisely, and as shown in detail on FIGS. 5, 6A and 6B, the steering rack 4 is carried by a rack bar 14, said bar 14 of the steering rack 4 being guided by two flanges 15 in the casing.

Each of these two flanges is situated at one of the ends 5 of the transverse beam 3, inside the tubular part 61 of each of the protuberances 6. The flanges 15 each have a guide opening 34 through which the bar 14 of the steering rack passes, said flanges being placed coaxially relative to the transverse axis Y. These flanges 15 are fixed to the transverse beam 3 by four bolts 35 uniformly distributed around the revolution form of the flange 15.

In particular, each of the inner spaces of the tubular portion 61 of the protuberances 6 communicates with the inner space of the median tubular part via a cylindrical portion containing a ring 36 forming a plain bearing, wherein this ring 36 is held in this cylindrical portion at a stop in the transverse axis Y:
firstly, against part of the cylindrical portion having locally a section of reduced diameter, and
secondly, against one of the flanges 15.

The bar 14 of the steering rack 4 is thus in a sliding connection along the transverse axis Y, its translation being guided by flanges 15 and controlled by a steering pinion 20 carried by a steering column 26. Said steering pinion 20 is guided in the beam 3 forming the casing by a roller bearing 21 and a needle cage 22. The roller bearing 21 and the needle cage 22 are held directly in a housing of said beam 3 (see FIG. 6B).

To maintain the mechanical connection between the steering pinion 20 and the steering rack 4, a pusher 31 is provided, exerting a pressure on the rack bar 14 opposite the connection, and a pusher screw 32 helping to hold the pusher 31 in contact with and at a stop against said bar 14.

The pusher screw 32 and the pusher 31 are held in an opening 33 of the beam 3 forming the casing, this opening forming a communication between the inner space of the tubular median part 31 housing the steering rack 4, and an outer space. The opening is oriented substantially radially relative to the transverse axis Y, preferably substantially along the longitudinal axis X.

Thus the movement applied by the driver is transmitted via the steering column 26 fixed to the center of a steering wheel, said steering column 26 driving the steering rack 4 in translation in the transverse axis Y by rotation of the steering pinion 20, said steering bar 14 then transmitting the torque to steering tie rods 24 situated at the ends of the steering rack 4 and acting directly on the wheels.

Travel stops 37 are provided at the two ends of the steering bar 14.

Figure 7:
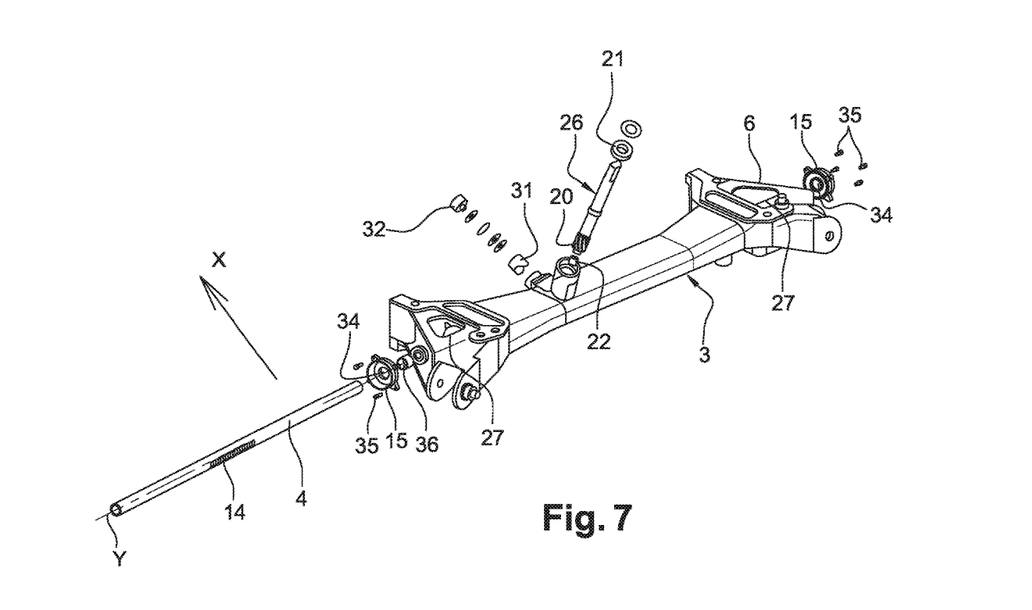
FIG. 7 is an exploded, perspective view of a transverse beam according to this embodiment.

Two steering gaiters 23 are provided to ensure the seal between the beam 3 and the steering tie rods 24, each of the two gaiters 23 being fitted over one of the flanges 15. More precisely, the gaiters are held fixed to the beam 3 by means of a fixing collar 25 attached to said beam 3 by bolting of said collar 25 over one of the protuberances 6.

A window 27 arranged in each of the protuberances 6 is provided here to facilitate access to the fixing means of the gaiters with the beam 3. Each of the windows 27 is here open vertically over a wall which is vertically the highest of the associated protuberance 6, in order to facilitate high level access.

Also, the beam 3 is held fixedly relative to the receiving structure 7 by means of connecting elements 28. In fact each of the side members 71 has a platform 29 extending towards an inner space delimited by the two side members 71, this platform 29 being fixed to said side members by welding to an intermediate element 30 forming a bracket, said intermediate element being welded to said associated side member 71.

In this embodiment, the transverse beam 3 forming the casing is fixed by means of bolts 38 passing through said transverse beam 3 and bolted into the platform 30 of the receiving structure 7.

Figure 2B:
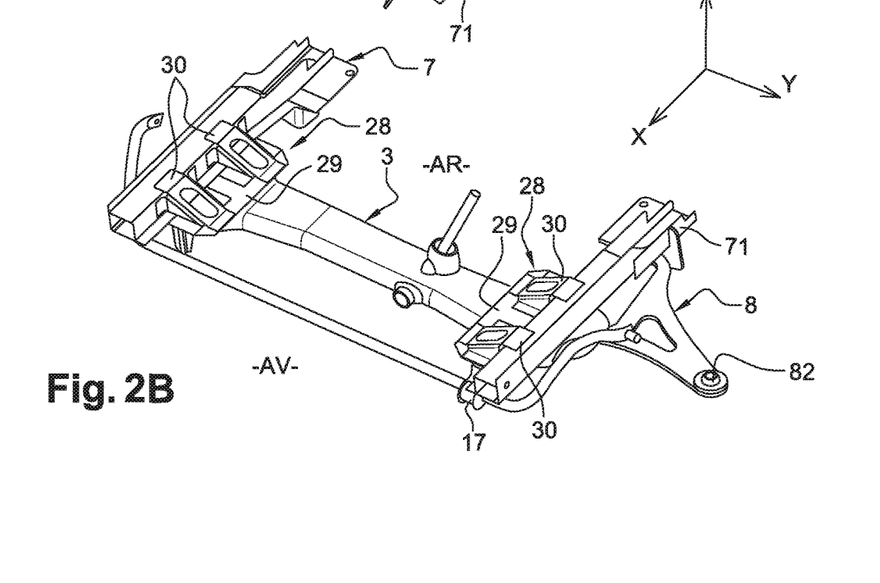

Also, the front unit comprises an anti-roll bar 16 so as to limit the roll of the vehicle 2 while ensuring a flexible connection between the left and right components of the chassis.

In particular, the anti-roll bar 16 is fixed to the transverse beam 3 forming the casing by means of support collars 17 for holding the anti-roll bar 16 on the bearings 18, which are fixed by bolting to the protuberances 5 of the beam 3. In other words, these bearings 18 are held by the collars 17, the collars 17 being bolted directly into the beam 3 forming the casing. Receiving faces for receiving the collars 17 are formed integrally with the protuberances 6 of said beam 3.

A front unit as described above therefore allows:
upgrading of the transverse beam forming the casing to ensure the support of the anterior pivot joints of the suspension arms, improving the compactness and simplicity of the structure of the front unit;
upgrading of the transverse beam forming the casing to ensure the support of the anti-roll bar, further improving the compactness and simplicity of the structure of the front unit;
the positioning of the steering rack before the suspension arm;
the positioning of the rack axis in the plane of the suspension arm, or even at a lower height depending on the desired chassis topology;
reduction of the indeformable mask in the case of a crash, and a more effective energy absorption by deformation of the receiving structure;
avoidance of solid, costly parts of bulky materials, ensuring a more compact, light and less bulky structure; and
a greater rigidity of support of the posterior pivot joint, improving the strength of the structure and hence the safety of the vehicle.

The invention is described above as an example. It is understood that the person skilled in the art is able to produce various embodiments of the invention without leaving the scope of the invention.

The invention claimed is:

1. A front unit of a motor vehicle, comprising:
a transverse beam, having a front side and a back side opposite the front side, forming a casing with a steering rack and having, at ends of the transverse beam, protuberances arranged to be fixed to a receiving structure of the vehicle;
two suspension arms, each positioned at one of the ends of the transverse beam and each having at least one first and one second pivot joint;
a front part to be directed towards a front of the vehicle; and
a rear part to be directed towards a rear of the vehicle, the steering rack being situated at the front relative to the suspension arms,
wherein the transverse beam comprises a fixing interface to receive a single pivot joint of each of the suspension arms, the fixing interfaces being provided at the back side of the transverse beam.

2. The front unit as claimed in claim 1, wherein each of the suspension arms comprises:
the first pivot joint fixed to the fixing interface; and
the second pivot joint fixed to the receiving structure of the vehicle.

3. The front unit as claimed in claim 1, wherein the suspension arms are situated at a horizontal level as close as possible to a level of the steering rack.

4. The front unit as claimed in claim 1, wherein the first pivot joint is situated at the front relative to the second pivot joint.

5. The front unit as claimed in claim 1, wherein each of the second pivot joints is fixed to a cap, said cap being welded to the receiving structure.

6. The front unit as claimed in claim 1, wherein the first and second pivot joints comprise bearings to facilitate rotational movement.

7. The front unit as claimed in claim 1, wherein the steering rack comprises a rack bar, said rack bar being guided by flanges in the transverse beam forming the casing.

8. The front unit as claimed in claim 1, further comprising:
an anti-roll bar.

9. The front unit as claimed in claim 8, wherein the anti-roll bar is fixed to the transverse beam forming the casing by support collars to hold the anti-roll bar on bearings which are fixed, by bolting, to the protuberances of the transverse beam.

10. The front unit as claimed in claim 9, wherein the support collars are fixed by bolting the support collars to the protuberances of the transverse beam.

11. The front unit as claimed in claim 1, wherein the transverse beam forming the casing is made of one piece.

12. A motor vehicle, comprising:
the front unit as claimed in claim 1.

* * * * *